United States Patent [19]
Kawazu et al.

[11] Patent Number: 5,880,187
[45] Date of Patent: Mar. 9, 1999

[54] TOP COATING COMPOSITIONS

[75] Inventors: Kenji Kawazu, Aichi-ken; Koichi Seike, Chigasaki; Chikara Kawamura, Hiratsuka; Hiroaki Kiyata, Aichi-ken; Hiroyuki Onoyama, Nisshin, all of Japan

[73] Assignee: Toyota Jidosha Kabushiki Kaisha, Aichi-ken, Japan

[21] Appl. No.: 847,669

[22] Filed: Apr. 22, 1997

[30] Foreign Application Priority Data

Apr. 24, 1996 [JP] Japan ................................. 8-102287
May 16, 1996 [JP] Japan ................................. 8-121332

[51] Int. Cl.$^6$ ........................................................ C08F 8/00
[52] U.S. Cl. .................... 525/101; 525/100; 525/106; 524/506; 524/515; 524/513; 524/539
[58] Field of Search .................................. 525/100, 106, 525/101; 524/506, 515, 513, 539

[56] References Cited

U.S. PATENT DOCUMENTS 5,330,796   7/1994   Kasari et al. ........................ 427/407.1

FOREIGN PATENT DOCUMENTS 6-41496   2/1994   Japan .

Primary Examiner—Margaret W. Glass
Attorney, Agent, or Firm—Armstrong, Westerman, Hattori, McLeland & Naughton

[57] ABSTRACT

The present invention relates to a top coating composition having:

(A) A hydroxyl-containing vinyl resin containing 40 to 90 wt. % of an aromatic hydrocarbon ring-containing vinyl monomer as a monomer component, optionally in combination with (B) a hydroxyl-containing polyester resin, (C) hexamethoxymethylmelamine and/or an etherified melamine resin obtained by substituting a part or the whole of the methoxy groups in hexamethoxymethylmelamine by an alkoxy group having at least 4 carbon atoms, (D) a particulate polymer having an average particle diameter of 0.01 to 1 μm, and (E) a polysiloxane compound represented by the formula

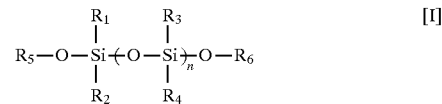

[I]

wherein $R_1$, $R_2$, $R_3$ and $R_4$ are the same or different and each represent a $C_{1-10}$ alkyl group, a $C_{1-10}$ alkoxy group or a hydroxyl group, $R_5$ and $R_6$ are the same or different and each represent $C_{1-10}$ alkyl group or a hydrogen atom, and n is an integer of 10 to 1,000.

7 Claims, No Drawings

TOP COATING COMPOSITIONS

The present invention relates to a coating composition which can form a coating film excellent especially in stain resistance, flexibility, acid resistance, gloss, etc., said composition being suitable as a top coating composition for automotive plastic members.

It is important for top coating compositions for automotive plastic members to have performance to form a coating film with excellent finishing appearance which is outstanding in smoothness, gloss and distinctness-of-image gloss, and excellent processability including flexibility. Conventionally used top coating compositions for automotive plastic members, which comprise a hydroxyl-containing acrylic resin or a hydroxyl-containing polyester resin and an amino resin, can give coating films excellent in finishing appearance, weather resistance, processability and the like.

However, in recent years, increasing air pollution constitutes a serious public problem of acid rain which damages forests and so on, and automotive plastic exterior panels coated with the above coating composition has the drawback of being susceptible to surface deterioration by acid rain. At present, a coating composition free from said drawback is known which comprises a hydroxyl-containing vinyl resin containing a hydrocarbon ring-containing vinyl monomer as a monomer component, a hydroxyl-containing polyester resin, an amino resin and a particulate polymer (Japanese Unexamined Patent Publication No. 41496/1994). However, it is hoped that top coating films for automotive plastic members are further improved in stain resistance, flexibility, acid resistance, gloss and other properties.

An object of the present invention is to provide a coating composition which is capable of forming a coating film remarkably improved in acid resistance, flexibility, stain resistance, gloss and other properties without impairing the finishing appearance, weather resistance, processability and the like of the coating film.

The present invention provides a top coating composition comprising:

(A) a hyciroxyl-containing vinyl resin containing 40 to 90 wt. % of an aromatic hydrocarbon ring-containing vinyl monomer as a monomer component, optionally in combination with (B) a hydroxyl-containing polyester resin, (C) hexanethoxymethylmelamine and/or an etherified melamine resin obtained by substituting a part or the whole of the methoxy groups in hexamethoxymethylmelamine by an alkoxy group having at least 4 carbon atoms, (D) a particulate polymer having an average particle diameter of 0.01 to 1 Im, and (E) a polysiloxane compound represented by the formula

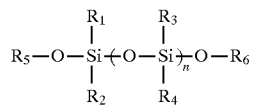

[I]

wherein $R_1$, $R_2$, $R_3$ and $R_4$ are the same or different and each represent a $C_{1-10}$ alkyl group, a $C_{1-10}$ alkoxy group or a hydroxyl group, R5 and R6 are the same or different and each represent $C_{1-10}$ alkyl group or a hydrogen atom, and n is an integer of 10 to 1,000.

The present inventors carried out extensive research and found that the above object can be achieved by a coating film formed from a coating composition mainly comprising a hydroxyl-containing vinyl resin containing an aromatic hydrocarbon ring-containing vinyl monomer in a specific proportion range, a specific etherified melamine resin, a particulate polymer and a specific polysiloxane compound. The present invention has been accomplished based on these findings.

The component (A) of the coating composition of the present invention is a hydroxyl-containing vinyl resin containing 40 to 90 wt. % of an aromatic hydrocarbon ring-containing vinyl monomer as a monomer component. The hydroxyl-containing vinyl resin contains 40 to 90 wt. %, preferably 45 to 75 wt. % of an aromatic hydrocarbon ring-containing vinyl monomer as a monomer component. Less than 40 wt. % of the aromatic hydrocarbon ring-containing vinyl monomer results in a coating film poor in acid resistance, finishing properties and the like, whereas if the proportion exceeds 90 wt. %, the processability of the coating film is impaired.

The aromatic hydrocarbon ring-containing vinyl monomer may have one or more aromatic hydrocarbon rings, such as monocyclic ring (e.g., benzen ring) and condensed ring (e.g., naphthalene ring), and includes those having a structure in which the ring is substituted by an alkyl group (e.g., a $C_{1-4}$ lower alkyl group).

Specifically stated, the hydroxyl-containing vinyl resin containing an aromatic hydrocarbon ring-containing vinyl monomer as a monomer component is obtained preferably by radically copolymerizing an aromatic hydrocarbon ring-containing vinyl monomer, a hydroxyl-containing vinyl monomer and other vinyl monomer.

Specific examples of the aromatic hydrocarbon ring-containing vinyl monomer include styrene, A-methylstyrene, phenyl (meth)acrylate, phenylethyl (meth)acrylate, phenylpropyl (meth)acrylate, benzyl (meth)acrylate, phenoxyethyl (meth)acrylate, esterification products of p-tert-butyl-benzoic acid and hydroxyethyl (meth)acrylate, and the like.

The above aromatic hydrocarbon ring-containing vinyl monomers may be used singly, or two or more of them can be used in combination. Particularly preferred is single use of styrene or combined use of styrene and other aromatic hydrocarbon ring-containing vinyl monomer. In the case of combined use, styrene is used as the aromatic hydrocarbon ring-containing vinyl monomer component in a proportion of about 20 wt. % or more, preferably about 40 wt. % or more. Styrene is economically advantageous and suitable for practical use due to its low cost. Further, use of styrene results in a coating film excellent in acid resistance and other properties.

The hydroxyl-containing vinyl monomer has one vinyl group and at least one hydroxyl group in a molecule. Examples of said monomer include mono(meth)acrylic acid esters of divalent alcohols, ε-caprolactone-modified vinyl monomers and the like.

Examples of the (meth)acrylic acid esters of divalent alcohols include 2-hydroxyethyl (meth)acrylate, hydroxypropyl (meth)acrylate, 2,3-dihydroxypropyl (meth)acrylate, 1,4-butanediol monoacrylate, (poly)ethylene glycol mono(meth)acrylate and the like.

The ε-caprolactone-modified vinyl monomer includes monomers represented by the formula

[II]

wherein R is a hydrogen atom or a methyl group, n' is an average polymerization degree of the monomer, which is 0.5 to 5. Examples of such monomers include, but are not limited to, "Placcel FA-1", "Placcel FA-2", "Placcel FA-3", "Placcel FA-4", "Placcel FA-5", "Placcel FM-1", "Placcel FM-2", "Placcel FM-3", "Placcel FM-4" and "Placcel FM-5" (all of which are products of Daicel Chemicals Co., Ltd., trade names, esters of 2-hydroxyethyl acrylate).

The above hydroxyl-containing monomers can be used singly, or two or more of them can be used in combination. Among these monomers, 1,4-butanediol monoacrylate gives a coating film excellent in scratch resistance, and ε-caprolactone-modified (meth)acrylate of the formula [II] forms a coating film with excellent processability. Thus, it is desirable to use each of these monomers singly or in combination with other hydroxyl-containing vinyl monomer.

Most preferably, the amount of the hydroxyl-containing vinyl monomer is determined so that the hydroxyl-containing vinyl resin (A) has a hydroxyl value of 60 to 140 mg KOH/g resin, especially 90 to 120 mg KOH/g resin. A hydroxyl value less than 60 mg KOH/g resin may reduce the scratch resistance, whereas a hydroxyl value exceeding 140 mg KOH/g resin detracts from the compatibility with the melamine resin and particulate polymer, leading to impaired finishing appearance.

In the preparation of the component (A) according to the present invention, it is especially preferred to copolymerize at least 10 wt. % of ε-caprolactone-modified (meth)acrylic monomer in the hydroxyl-containing vinyl monomer, together with a (meth)acrylic acid ester monomer of a divalent alcohol having not more than 3 carbon atoms in a proportion that gives a hydroxyl value of 60 to 140 mg KOH/g resin.

As the other vinyl monomer, a (meth)acrylic acid ester of a $C_{4-24}$ monovalent alcohol is preferably used. Specific examples are n-butyl (meth)acrylate, isobutyl (meth)acryLate, t-butyl (meth)acrylate, 2-ethylhexyl (meth)acylate, n-octyl (meth)acrylate, lauryl (meth)acrylate, tridecyl (meth)acrylate, stearyl (meth)acrylate and the like.

When styrene is used as the aromatic hydrocarbon ring-containing vinyl monomer, use of an acrylic acid ester of a $C_{4-24}$ monovalent alcohol as the other monomer improves the copolymerizability of the styrene, and remarkably reduces the amount of styrene oligomer produced in a low molecular weight range (weight average molecular weight of about 2,000 or less). As a result, a coating film with excellent acid resistance can be formed without impairing the weather resistance. Specific examples of the acrylic acid ester of a $C_{4-24}$ monovalent alcohol are given above in the description of the (meth)acrylic acid esters of $C_{4-24}$ monovalent alcohols.

The other vinyl monomer is desirably used in a proportion of about 1 to about 45 wt. %, preferably about 5 to about 40 wt. %, as the proportion of the monomer component of the hydroxyl-containing vinyl resin. Less than about 1 wt. % of the other monomer results in low scratch resistance, weather resistance, processability and the like, whereas about 45 wt. % or more of the other monomer impairs the scratch resistance, acid resistance and the like. Thus, proportions outside said range are not preferable.

Known radically polymerizable monomers not mentioned above may be properly selected and used as the other vinyl monomer. Specific examples include (meth)acrylic acid, maleic acid, maleic anhydride, (meth)acrylonitrile and the like. Said monomers are used in a proportion of about 10 wt. % or less in the other vinyl monomer component.

The copolymerization of the aromatic hydrocarbon ring-containing vinyl monomer, hydroxyl-containing vinyl monomer and other vinyl monomer can be carried out in the same manner as the synthesis of ordinary acrylic resins, vinyl resins and the like.

The weight average molecular weight of the hydroxyl-containing vinyl resin (A) is preferably 3,000 to 30,000. A weight average molecular weight less than 3,000 may reduce the weather resistance, whereas a weight average molecular weight exceeding 30,000 may impair the finishing appearance.

The composition of the present invention essentially comprises the hydroxyl-containing vinyl resin (A) as a hydroxyl-containing resin, and may further contain an optional hydroxyl-containing polyester resin (B) when necessary, whereby the flexibility of the coating film is advantageously improved.

Preferably usable as the hydroxyl-containing polyester resin (B) are resins obtained by reacting a polybasic acid (or anhydride of polybasic acid), a polyvalent alcohol, and when necessary, a monobasic acid.

The polybasic acid includes compounds having 2 to 4 carboxyl groups in a molecule, alkyl ester compounds thereof and the like. Specific examples are isophthalic acid, terephthalic acid, orthophthalic acid, 2,6-naphthalenedicarboxylic acid, 4,4'-diphenylmethanedicarboxylic acid, tetrahydrophthalic acid, methyltetrahydrophthalic acid, hexahydrophthalic acid, methylhexahydrophthalic acid, endomethylenehexahydrophthalic acid, methylendomethylenetetrahydrophthalic acid, maleic acid, fumaric acid, itaconic acid, succinic acid, glutaric acid, adipic acid, azelaic acid, pimelic acid, suberic acid, sebacic acid, dimer acid, 1,4-cyclohexanedicarboxylic acid, trimesic acid, trimellitic acid, pyromellitic acid, cyclohexanetetracarboxylic acid and alkylesters, anhydrides and other reactive derivatives of these polybasic acids.

The polyvalent alcohol includes aliphatic polyvalent alcohols having 2 to 6 hydroxyl groups in a molecule. Typical examples are ethylene glycol, propylene glycol, trimethylene glycol, 1,4-butanediol, 1,3-butanediol, 1,5-pentanediol, 1,6-hexanediol, neopentyl glycol, 2-butyl-2-ethylpropanediol, glycerine, trimethylolethane, trimethlylolpropane, pentaerythritol, dipentaerythritol, sorbitol, polyesterpolyol compounds obtained by addition reaction of the polyvalent alcohol and ε-caprolactone, and the like. Also, alicyclic polyvalent alcohols such as 1,4-cyclohexanedimethanol, tricyclodecanedimethanol, hydrogenated bisphenol, alkylene oxide adducts of hydrogenated bisphenol and the like, aromatic polyvalent alcohols such as bishydroxyethyl terephthalate, bisphenol, alkylene oxide adducts of bisphenol and the like, and monoepoxy compounds such as methylene oxide, ethylene oxide and the like can be used in combination with the above aliphatic polyvalent alcohols, when necessary.

The monobasic acid which can be used when necessary includes benzoic acid, p-tert-butylbenzoic acid, methylbenzoic acid and the like.

The hydroxyl-containing polyester resin can be produced in the same manner as the synthesis of ordinary polyester resins or alkyd resins, for example, by reacting a mixture of the above components in inert gas atmosphere at about 160° to about 250° C. for about 3 to about 10 hours while removing the condensation by-products from the reaction system. When necessary, an esterification catalyst, organic solvent and the like can be used in the reaction.

The obtained hydroxyl-containing polyester resin has a hydroxyl value of 10 to 200 mg KOH/g resin, preferably 25 to 150 mg KOH/g resin and a weight average molecular weight of 1,000 to 30,000, preferably 3,000 to 15,000 and a glass transition temperature of 10° C. or less, preferably –10° to –100° C.

The component (C) of the composition of the present invention is a crosslinking agent which reacts with the hydroxyl groups in the hydroxyl-containing vinyl resin (A) and the hydroxyl-containing polyester resin (B) for crosslinking, and is hexamethoxymethylmelamine and/or an etherified melamine resin obtained by substituting a part or the whole of the methoxy groups in hexamethoxymethylmelamine by an alkoxy group having at least 4 carbon atoms.

Usable as the melamine resin are a hexamethoxymethylmelamine resin prepared from a partially or completely hydroxymethylated melamine resin obtained by the reaction of melamine and an aldehyde by the etherification with methanol, and a melamine resin prepared from the hydroxymethylated melamine resin by the etherification using a proper monovalent alcohol having at least 4 carbon atoms in place of or in combination with the methanol. The aldehyde to be reacted with melamine includes, for example, formaldehyde, paraformaldehyde, acetoaldehyde, benzaldehyde and the like. The alcohol having at least 4 carbon atoms for use in the etherification includes, for example, n-butyl alcohol, isobutyl alcohol, 2-ethyl butanol, 2-ethyl hexanol and the like.

According to the present invention, the melamine resin for use as the component (C) includes melamine resins available under the trademarks "Cymel 303" (fully methoxylated melamine resin, product of Cytec Co., Ltd.), "U-Van 20SE-60" (butoxylated melamine resin, product of Mitsui Toatsu Chemicals Inc.) and the like.

The component (D) of the coating composition of the present invention is a particulate polymer having an average particle diameter of 0.01 to 1 $\mu$m.

Use of the particulate polymer in the coating composition of the present invention enables the formation of a coating film still more improved in finishing appearance and durability.

It is essential that the particulate polymer be insoluble in the organic solvent used in the coating composition of the present invention. The polymer may be crosslinked or non-crosslinked, but a crosslinked polymer is preferred. The particulate polymer is known per se and can be suitably selected from those conventionally used. Especially preferred is a nonaqueous dispersion type vinyl resin.

The nonaqueous dispersion type vinyl resin is prepared by dispersing and polymerizing at least one vinyl monomer in the presence of a polymeric dispersion stabilizer and an organic solvent. The polymeric dispersion stabilizer includes those conventionally used in the field of nonaqueous dispersion, for example, the following (1) to (9).

(1) A polyester macromonomer prepared by subjecting a self-condensed polyester of a hydroxyl-containing fatty acid (such as 12-hydroxystearic acid) and glycidyl acrylate or glycidyl methacrylate to addition reaction in order to introduce about 1.0 polymerizable double bond to the molecule (2) A comb type polymer prepared by copolymerizing the above polyester macromonomer (1) and methyl methacrylate and/or other (meth)acrylic acid ester and/or vinyl monomer (3) The comb type polymer (2) to which a double bond is introduced by copolymerizing a small amount of glycidyl methacrylate together with the other monomers and reacting (meth)acrylic acid with the glycidyl group in the obtained polymer (4) A hydroxyl-containing acrylic copolymer prepared by copolymerizing at least 20 wt. % of (meth)acrylic acid ester of a monovalent alcohol having at least 4 carbon atoms (5) The hydroxyl-containing acrylic copolymer (4) to which at least 0.3 double bond per molecule is introduced based on the number average molecular weight, the double bond being introduced, for example, by polymerizing a small amount of glycidyl (meth)acrylate together with the other monomer and reacting (meth)acrylic acid with the glycidyl group in the obtained copolymer, or by polymerizing a small amount of (meth)acrylic acid together with the other monomers and reacting glycidyl (meth)acrylate with the carboxyl group in the obtained polymer (6) An alkoxylated melamine resin with a high tolerance for mineral spirits (7) An alkyd resin with an oil length of 15% or more and/or said alkyd resin to which a polymerizable double bond is introduced, for example, by reacting glycidyl (meth)acrylate with the carboxyl group in the alkyd resin (8) An oil-free polyester resin with a high tolerance for mineral spirits, an alkyd resin with an oil length of 15% or more and/or said alkyd resin to which a polymerizable double bond is introduced (9) Cellulose acetate butylate to which a polymerizable double bond is introduced, for example, by subjecting cellulose acetate butylate to addition reaction with isocyanate ethyl methacrylate These dispersion stabilizers can be used singly, or two or more of them can be used in combination.

Among the above dispersion stabilizers, especially preferred in the present invention are those soluble in a solvent with a relatively low polarity (such as aliphatic hydrocarbon) and meeting the requirements for the film performance to some extent. The above acrylic copolymers (4) and (5) satisfy these conditions and thus are preferably usable, said copolymers being easily adjustable for molecular weight, glass transition temperature, polarity (SP value of the polymer), hydroxyl value, acid value, etc., and being excellent in weather resistance. Also preferred are acrylic copolymers having on average in a molecule about 0.2 to about 1.2 polymerizable double bonds which can undergo graft polymerization with the dispersed particles.

The nonaqueous dispersion type vinyl resin for use in the present invention can be easily prepared by subjecting at least one vinyl monomer to dispersion polymerization in the presence of the above polymeric dispersion stabilizer in an organic solvent mainly comprising an aliphatic hydrocarbon which dissolves the dispersion stabilizer and the vinyl monomer forming the dispersed particles but substantially does not dissolve the particulate polymer formed from said vinyl monomer.

Various monomers are usable as the monomer components of the vinyl copolymer suitable as the polymeric dispersion stabilizer and the vinyl monomer forming the dispersed particles without specific limitation insofar as they are radically polymerizable unsaturated monomers. Typical examples of such monomers are as follows.

(a) Esters of acrylic acid or methacrylic acid

For example, $C_{1-18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, octyl methacrylate, lauryl methacrylate, stearyl methacrylate and the like; glycidyl acrylate and glycidyl methacrylate; $C_{2-8}$ alkenyl esters of acrylic acid or methacrylic acid such as allyl acrylate, allyl methacrylate and the like; $C_{2-8}$ hydroxyalkyl esters of acrylic acid or methacrylic acid such as hydroxyethyl acrylate, hydroxyethyl methacrylate, hydroxypropyl acrylate, hydroxypropyl methacrylate and the like; $C_{3-18}$ alkenyloxyalkyl esters of acrylic acid or methacrylic acid such as allyloxyethyt acrylate, allyloxyethyl methacrylate and the like; etc.

(b) Vinyl aromatic compounds

For example, styrene, α-methylstyrene, vinyltoluene, p-chlorostyrene, vinylpyridine, etc.

(c) α,β-ethylenically unsaturated acids

For example, acrylic acid, methacrylic acid, itaconic acid, etc.

(d) Amides of acrylic acid or methacrylic acid

For example, acrylamide, methacrylamide, n-butoxymethylacrylamide, n-methylolacrylamide, n-butoxymethylmethacrylamide, n-methylolmethacrylamide, etc.

(e) Other radically polymerizable unsaturated monomers

For example, acrylonitrile, methacrylonitrile and methyl isopropenyl ketone; vinyl acetate, Veova monomer (product of Shell Chemical Co. Ltd.), vinyl propionate, vinyl pivalate, isocyanate ethyl methacrylate, perfluorocyclohexyl (meth)acrylate, p-styrene sulfonamide, N-methyl-p-styrene sulfonamide, γ-methacryloxypropyltrimethoxysilane, etc.

Among the above monomers, especially preferred for the preparation of the vinyl copolymer as the dispersion stabilizer is a monomer mixture comprising mainly a low-polarity monomer having a relatively long chain, such as n-butyl methacrylate, 2-ethylhexyl methacrylate, dodecyl methacrylate, lauryl methacrylate, stearyl methacrylate or the like, and optionally other monomer such as styrene, methyl (meth)acrylate, ethyl (meth)acrylate, 2-hydroxyethyl (meth)acrylate, propyl (meth)acrylate, (meth)acrylic acid or the like.

Preferably usable is a vinyl copolymer of these monomers to which a polymerizable double bond is introduced by addition reaction with glycidyl (meth)acrylate or isocyanate ethyl methacrylate after copolymerization.

The vinyl copolymer for use as the dispersion stabilizer is easily prepared by a conventional solution polymerization method using a radical polymerization initiator.

The number average molecular weight of the dispersion stabilizer is preferably about 1,000 to about 50,000, more preferably about 3,000 to about 20,000.

Among the above monomers, especially preferable as the vinyl monomer forming the dispersed particles are a monomer mixture comprising mainly a relatively high-polarity monomer such as methyl (meth)acrylate, ethyl (meth) acrylate, n-butyl acrylate, acrylonitrile or the like, and optionally other monomer such as (meth)acrylic acid, 2-hydroxyethyl (meth)acrylate or the like. The particles may be internally crosslinked to form gelled particles, by use of a small amount of a polyfunctional monomer such as divinylbenzene, ethylene glycol dimethacrylate or the like in the copolymerization, or by copolymerization of a plurality of monomers each having a functional group reactive with the functional group in the other monomer, like glycidyl methacrylate and methacrylic acid, or by copolymerization of a self-reactive monomer such as N-alkoxymethylated acrylamide, γ-methacryloxytrialkoxysilane or the like.

For the dispersion polymerization, a suitable weight ratio of the dispersion stabilizer to the vinyl monomer forming the dispersed particles is 5/95 to 80/20, preferably 10/90 to 60/40. The dispersion polymerization can be carried out by a conventional method in the presence of a radical polymerization initiator.

The component (E) of the coating composition of the present invent on is a polysiloxane compound represented by the formula

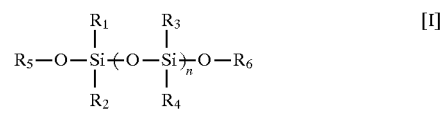

wherein $R_1$, $R_2$, $R_3$ and $R_4$ are the same or different and each represent a $C_{1-10}$ alkyl group or a $C_{1-10}$ alkoxy group or a hydroxyl group, $R_5$ and $R_6$ are the same or different and each represent a $C_{1-10}$ alkyl group or a hydrogen atom, and n is an integer of 10 to 1,000.

Addition of said polysiloxane compound to the coating composition increases the compatibility between the other components (A), (B), (C) and (D) of the coating composition of the present invention and improves the gloss of the coating film.

The $C_{1-10}$ alkyl group includes, for example, methyl, ethyl, propyl, butyl, hexyl, octyl, nonyl and the like.

The $C_{1-10}$ alkoxy group includes, for example, methoxy, ethoxy, propoxy, butoxy and the like.

The molecular weight of the polysiloxane compound is not limited specifically, but usually used is a polysiloxane compound with a number average molecular weight of 1,000 to 100,000, preferably 2,000 to 50,000.

The coating composition of the present invention is obtained by mixing and dispersing the above components (A), (B), (C), (D) and (E) in an organic solvent.

The mixing ratio of the components is not limited specifically. However, when the hydroxyl-containing vinyl resin (A) is singly used as the hydroxyl-containing resin, the preferred proportions of the components (A), (C) and (D) are 30 to 80 wt. %, especially 50 to 70 wt. % of the component (A), 5 to 40 wt. %, especially 10 to 25 wt. % of the component (C), and 3 to 30 wt. %, especially 5 to 15 wt. % of the component (D), based on 100 wt. % of the total amount of these components. The component (E) is preferably used in a proportion of 0.01 to 3 wt. parts, especially 0.05 to 0.5 wt. part based on 100 wt. parts of the total amount of the components (A), (C) and (D).

When the hydroxyl-containing vinyl resin (A) and the hydroxyl-containing polyester resin (B) are combinedly used as the hydroxyl-containing resin, the proportions of the components are not limited specifically. Preferred proportions of the components (A), (B), (C) and (D) are 20 to 70 wt. %, especially 40 to 60 wt. % of the component (A), 5 to 40 wt. %, especially 10 to 25 wt. % of the component (B), 5 to 40 wt. %, especially 15 to 30 wt. % of the component (C), and 3 to 30 wt. %, especially 5 to 10 wt. % of the component (D), based on 100 wt. % of the total amount of these components. The component (E) is preferably used in a proportion of 0.01 to 3 wt. parts, especially 0.05 to 0.5 wt. part based on 100 wt. parts of the total amount of the components (A), (B), (C) and (D)

The coating composition of the present invention may contain, in addition to the above-mentioned components, a small amount of a modified resin such as cellulose acetate butylate, epoxy resin, alkyd resin or the like. When necessary, additives may be used which include organic solvents, pigments, curing catalysts, UV absorbers, surface conditioning agents, antioxidants, flowability adjusting agents, pigment dispersants, silane coupling agents and the like.

Examples of the organic solvent include hydrocarbon solvents such as heptan, toluene, xylene, octane, mineral spirits and the like, ester solvents such as ethyl acetate, n-butyl acetate, isobutyl acetate, methyl cellosolve acetate, butylcarbitol acetate and the like, ketone solvents such as methyl ethyl ketone, methyl isobutyl ketone, diisobutyl ketone and the like, alcohol solvents such as methanol, ethanol, isopropanol, n-butanol, sec-butanol, isobutanol and the like, ether solvents such as n-butyl ether, dioxane, ethylene glycol monomethyl ether, ethylene glycol monoethyl ether and the like, aromatic petroleum solvents available under the trade names "Swazol 310", "Swazol 1000" and "Swazol 1500" (products of Cosmo Oil Co., Ltd.) and the like. These organic solvents can be used singly or as a mixture of two or more. From the viewpoint of curability, those having a boiling point of about 150° C. or less are preferable, but usable solvents are not limited thereto.

Pigments which may be contained in the coating composition of the present invention include, for example, organic pigments (e.g., quinacridone pigments such as quinacridone, azo pigments such as pigment red, phthalocyanine pigments such as phthalocyanine blue and phthalocyanine green, and the like), inorganic pigments (e.g., titanium oxide, barium sulfate, calcium carbonate, clay, silica and the like), carbon pigment (carbon black), metallic powders (e.g., aluminum, mica-form iron oxide, stainless steel and the like) and anti-corrosive pigments (e.g., red iron oxide, strontium chromate and the like).

The coating composition of the present invention, which comprises essentially the components (A), (C), (D) and (E) and optionally the component (B), can form a coating film which has a TUKON hardness of 4 to 12, preferably 6 to 10, and a glass transition temperature of 60° to 90° C., and is 700 or less in the molecular weight between crosslinks.

For the determination of TUKON hardness, a cured coating film baked under prescribed heating conditions is tested at 20° C. using a TUKON microhardness tester manufactured by American Chain & Cable Company. The harder the coating film, the higher the TUKON hardness value. According to the present invention, TUKON hardness below 4 or above 12 is not preferable, since if said hardness is below 4, markedly reduced stain resistance results, whereas if said hardness exceeds 12, the impact resistance, flexing resistance and other properties become insufficient.

The glass transition temperature is a dynamic glass transition temperature (° C.) determined for a separated coating film using a Vibron dynamic viscoelasticity measuring device (Dynamic Visco elastometer Model Vibron DDV-IIEA, product of Toyo Baldwin Co., Ltd.) at a frequency of 110 Hz and a heating rate of 3° C./min. If the glass transition temperature is below 60° C., the stain resistance markedly decreases.

The molecular weight between crosslinks is a theoretical value calculated by applying the above determined glass transition temperature value to the following rubber viscoelasticity theoretical equation of Flory et al. If the molecular weight between crosslinks exceeds 700, the stain resistance markedly reduces, thus it is not preferable.

Molecular weight between crosslinks (Mc)=3ρRT/Emin wherein R is equal to $8.131 \times 10^7$ (erg/°Kmol), T is a temperature (K) at which the elastic modulus is minimum, ρ is the density of the sample film (g/cm) which is generally 0.5, and Emin is the minimum elastic modulus (dyne/cm) in the high temperature range.

The coating composition of the present invention can be applied to a thickness of about 10 to about 60 μm (when dried), for example, by means of electrostatic coating (using a bell type coater or the like), air spray coating, etc. The coating is sufficiently dried usually at about 60° to about 140° C. in about 10 to about 60 minutes.

Since the coating composition of the present invention is characterized by excellent processability of the coating film, the composition is preferably used as a top coating composition for plastic substrates. The process for forming the coating film is discussed below.

The coating film is formed by applying the coating composition of the invention directly to a plastic substrate or to the surface of the plastic substrate coated with a primer or with a primer and an intercoating, and curing the coating.

The plastic substrate is not limited specifically, and specific examples include polypropylene, ethylene-propylene copolymers, EPDM, polyamide, polyester, polyphenylene oxide, acrylonitrile-butadiene-styrene copolymers, polycarbonate, ethylene-vinyl acetate copolymers, unsaturated polyester, polyurethane, reinforced polyurethane and other plastics. When necessary, these plastic substrates may be washed or chemically treated with an alkali, acid, organic solvent or the like, or subjected to corona discharge treatment or other treatment before use.

Known processes can be employed for forming a top coating film by applying the coating composition of the invention to the above plastic substrate or to the coated surface of the plastic substrate. The processes include, for example, 1-coat 1-bake process (solid color coating), 2-coat 1-bake process (base coating/clear coating), 2-coat 2-bake process (base coating/clear coating), 3-coat 1-bake process (base coating/clear coating/clear coating), 3-coat 2-bake process (base coating/clear coating/clear coating) and the like. According to the present invention, it is preferred that the coating composition of the invention form the uppermost layer (e.g., as the clear coating formed by the 2-coat 1-bake process).

The 2-coat 1-bake process can be carried out, for example, by coating the plastic substrate with a colored base coating composition and subsequently with a clear top coating composition of the invention, and baking the coatings. The colored base coating composition and the clear top coating composition can be applied by conventional coating means, for example, using an electrostatic or non-electrostatic coater. The film thickness of the colored base coating is preferably about 10 to about 50 μm (when cured). After applying the base coating composition, the coated substrate is allowed to stand at room temperature for a few minutes or force-dried at about 50° to about 80° C. for a few minutes, and then the clear coating composition is applied to the base coating surface. The thickness of the clear coating is preferably 10 to 60μm (when cured). Subsequently, the coatings are heated at about 60° to about 140° C. for about 20 to about 40 minutes.

Production Examples, Examples and Comparative Examples are given below to illustrate the present invention in further detail, wherein "part(s)" and "%" are "wt. part(s)" and "wt. %", respectively, unless otherwise specified.

PRODUCTION EXAMPLE 1

(A) Production of a hydroxyl-containing acrylic resin solution (A-1)

An ordinary reactor for acrylic resins equipped with a stirrer, thermometer and reflux condenser is charged with 55 parts of Swazol 1000 (product of Cosmo Oil Co., Ltd., an aromatic solvent) and 5 parts of n-butanol, and the mixture was stirred with heating. After the temperature reached 130° C., the following monomer mixture was added dropwise over a period of 3 hours.

Styrene 60 parts

Lauryl methacrylate 17 parts

2-Hydroxyethyl acrylate 20 parts

Acrylic acid 3 parts

α,α'-Azobisisobutyronitrile 6 parts

After completion of the dropwise addition, the resulting mixture was maintained at 130° C. for 30 minutes, and a mixture of 0.5 part of azobisdimethylvaleronitrile and 20 parts of Swazol 1000 was added dropwise over a period of 1 hour. The mixture was stirred for 1 hour while being maintained at 125° C., and then cooled and diluted with 35 parts of Swazol 1000 and 5 parts of n-butanol, giving a hydroxyl-containing acrylic resin solution (A-1) having a solid concentration of 50%. The weight average molecular weight (MW) of the acrylic resin was 10,000, and the styrene content in the acrylic resin (percentage of the styrene content to the total amount of the monomer components) was 60%.

PRODUCTION EXAMPLES 2 to 6

(A) Production of hydroxyl-containing acrylic resin solutions (A-2) to (A-6)

A hydroxyl-containing acrylic resin solutions (A-2) to (A-6) were produced in the same manner as Production Example 1. The solutions (A-2) to (A-6) all had a solid concentration of 50%.

Table 1 shows the formulations and weight average molecular weights (MW) of the hydroxyl-containing acrylic resin solutions (A-1) to (A-6) and the styrene contents in the acrylic resins.

Table 2 shows the formulations (in molar ratio) and characteristic values of the polyester resin solutions (B-1) to (B-2).

TABLE 2

| Production Example | 7 | 8 |
|---|---|---|
| Polyester resin solution | (B-1) | (B-2) |
| 1,6-Hexanediol (mole) | 0.90 | 0.90 |
| Trimethylolpropane (mole) | 0.10 | 0.10 |
| Adipic Acid (mole) | 0.50 | 0.70 |
| Isophthalic acid (mole) | 0.45 | 0.25 |
| Weight average molecular weight (MW) | 12,000 | 12,000 |
| Acid value (mg KOH/g) | 8 | 8 |
| Hydroxyl value (mg KOH/g) | 48 | 49 |
| Glass transition temperature | −59° C. | −72° C. |

TABLE 1

| Production Example No. | 1 | 2 | 3 | 4 | 5 | 6 |
|---|---|---|---|---|---|---|
| Acrylic resin solution | A-1 | A-2 | A-3 | A-4 | A-5 | A-6 |
| Styrene (part) | 60 | 50 | 55 | 70 | 20 | 30 |
| Lauryl methacrylate (part) | 17 | 27 | 22 | 7 | 57 | 47 |
| 2-Hydroxyethyl acrylate (part) | 20 | 20 | 20 | 20 | 20 | 20 |
| Acrylic acid (part) | 3 | 3 | 3 | 3 | 3 | 3 |
| Weight average molecular weight (MW) | 10,100 | 10,000 | 10,000 | 10,000 | 10,000 | 10,000 |
| Hydroxyl value (mg KOH/g) | 96.7 | 96.7 | 96.7 | 96.7 | 96.7 | 96.7 |
| Styrene content in the acrylic resin (%) | 60 | 50 | 55 | 70 | 20 | 30 |

PRODUCTION EXAMPLE 7

(B) Production of a hydroxyl-containing polyester resin solution (B-1)

An ordinary polyester resin producing device equipped with a heater, stirrer, reflux condenser, water separator, fractionating tower and thermometer was used. The reactor of the device was charged with 45.51 parts (0.9 mole) of 1,6-hexanediol, 5.85 parts (0.1 mole) of trimethylolpropane, 31.28 parts (0.50 mole) of adipic acid and 32.00 parts (0.45 mole) of isophthalic acid. The mixture was heated, and stirring was started when the starting materials were dissolved and became capable of being stirred. Then, the temperature in the reactor was raised to 230° C., wherein, from 160° C. to 230° C., the temperature was raised over a period of 3 hours at a uniform rate. The produced condensed water was distilled off from the system through the fractionation tower. When the temperature reached 230° C., the reaction mixture was maintained at the same temperature for 2 hours with stirring. Thereafter, xylol was placed into the reactor to carry out solvent condensation reaction, and the reaction was continued until an acid value of 8 mg KOH/g resin was reached. After completion of the reaction, the reaction mixture was cooled to a certain extent, diluted with 66.7 parts of xylol, giving a hydroxyl-containing polyester resin solution (B-1) having a solid concentration of 60. The weight average molecular weight (MW) of the polyester resin was 12,000.

PRODUCTION EXAMPLE 8

(B) Production of a hydroxyl-containing polyester resin solution (B-2)

A polyester resin solution (B-2) was prepared in the same manner as Production Example 7. The solid concentration of the solution was 60%.

The glass transition temperature shown in Table 2 is the values obtained by the differential thermal analysis.

PRODUCTION EXAMPLE 9

(D) Production of a particulate polymer (D-1)

An ordinary acrylic resin-producing reactor equipped with a stirrer, thermometer and reflux condenser was charged with 45.7 parts of xylol and 5 parts of n-butanol, and the mixture was stirred with heating. When the temperature reached 125° C., the following monomer mixture was added dropwise over a period of 3 hours.

Styrene 30 parts

Lauryl methacrylate 20 parts n-Butyl acryleite 10 parts

2-Ethylhexyl methacrylate 12 parts

2-Hydroxyethyl methacrylate 20 parts

2-Hydroxyethyl acrylate 5 parts

Acrylic acid 3 parts tert-Butyl peroctoate 4.6 parts

After completion of the dropwise addition, the resulting mixture was maintained at 125° C. for 30 minutes, and a mixture of 0.5 part of azobisdimethylvaleronitrile and 16 parts of xylol was added dropwise over a period of 1 hour, followed by 5-hour aging. The solid concentration of the obtained resin solution was 60%.

Subsequently, 0.03 part of 4-tert-butyl pyrocatechol and 2 parts of glycidyl methacrylate were added to 168 parts of the above obtained varnish to carry out a reaction at 125° C. for 5 hours, whereby a polymerizable double bond was introduced. Ninety parts of the obtained product, 48 parts of xylol and 105 parts of heptan were placed into a flask, and the following monomers and polymerization initiator were added dropwise at 90° C. over a period of 4 hours. Further, 0.5 part of tert-butyl perocotoate was added, and the resulting mixture was aged for 3 hours, giving a nonaqueous dispersion type vinyl resin (D-1).

Styrene 40 parts

Methyl methacrylate 20 parts

Acrylonitrile 16 parts

Glycidyl methacrylate 2 parts

2-Hydroxyethyl acrylate 20 parts

Methacrylic acid 2 parts

α,α'-Azobisisobutyronitrile 1 part

The obtained resin dispersion was a milk-like white dispersion having a solid content of 45%.

Examples using the hydroxyl-containing vinyl resin (A) as the hydroxyl-containing resin

EXAMPLES 1 to 3

Coating compositions of Examples 1 to 3 were prepared using the components shown in Table 3. The compositions were adjusted to a viscosity of 25 second (Ford cup #4/25° C.) by adding a mixed solvent (xylol/n-butanol=9/1 ), and subjected to the following tests.

COMPARATIVE EXAMPLES 1 and 2

Comparative coating compositions were prepared using the components shown in Table 3, diluted with a solvent in the same manner as in Examples 1 to 3, and subjected to the following tests.

Conditions for film formation

The coating compositions of Examples and Comparative Examples adjusted for viscosity were applied and cured to form coating films.

R-RIM (Reinforced-Reaction Injection Molding) urethane plastic was vapor-degreased with trichloroethane and spray-coated with a urethane elastomer resin gray-colored primer (product of Kansai Paint Co., Ltd., "Soflex No. 1000", primer) to a thickness of 15 to 20 μm (when dried). The coating was baked for drying at 80° C. for 30 minutes to prepare a plastic test piece.

The above obtained plastic test piece was coated with a metallic base coating composition (a) ("Soflex No. 1400", a metallic base coating composition, product of Kansai Paint Co., Ltd., melamine-curing coating composition) to a thickness of about 15 μm (when cured) using an air spray gun F5 (product of Meiji Machine Co., Ltd., trade name). The coated test piece was allowed to stand at room temperature for about 3 minutes, and each of the coating compositions of Examples and Comparative Examples was applied to a thickness of about 40 μm (when cured) using said air spray gun F5. The coated test piece was allowed to stand for setting at room temperature for about 10 minutes, and heated for curing with an electric hot-air dryer at 120° C. for 30 minutes, giving a test coated panel.

The baked film was tested for various properties. The results are shown in Table 3.

In respect of (*1) to (*12) in Table 3, details of the components and test methods for measuring the properties are described below.

Components (*1) Component (C): "Cymel 303", product of Cytec Co., Ltd., fully methoxylated melamine resin, trade name (*2) Catalyst: "Nacure 5543", product of King Industries, Co., Ltd. (a U.S. company), a neutralization product of dodecylbenzenesulfcnic acid amine containing about 25% active ingredient, trade name (*3) Component (E): Dimethylpolysiloxane of the formula [I] wherein $R_1$ to $R_6$ each represents a methyl group, having a number average molecular weight of 3,000

(*4) UV absorber: "Tinuvin 900", product of Ciba-Geigy, trade name

Test methods (*5) TUKON hardness: A tinplate was spray-coated with each of the coating compositions of Examples and Com-

TABLE 3

| | | | Example | | | Comp. Ex. | |
|---|---|---|---|---|---|---|---|
| | | | 1 | 2 | 3 | 1 | 2 |
| Component | Component (A) | Kind | A-1 | A-2 | A-3 | A-5 | A-1 |
| | | Amount | 70 | 70 | 70 | 70 | 70 |
| | Component (C) (*1) | | 25 | 25 | 25 | 25 | 25 |
| | Component (D) (D-1) | | 5 | 5 | 5 | 5 | 5 |
| | Catalyst (*2) | | 1 | 1 | 1 | 1 | 1 |
| | Component (E) (*3) | | 0.5 | 0.5 | 0.5 | 0.5 | — |
| | UV absorber (*4) | | 2 | 2 | 2 | 2 | 2 |
| Film property | TUKON hardness (*5) | | 12 | 11 | 10 | 2 | 11 |
| | Glass transition temperature (*6) | | 84 | 82 | 80 | 58 | 82 |
| | Molecular weight between crosslinks (*7) | | 630 | 622 | 600 | 592 | 626 |
| Test result | Stain resistance (*8) | Visual inspection | A | A | A | D | A |
| | | Color difference ΔE | 0.3 | 0.3 | 0.5 | 5.3 | 0.5 |
| | Weather resistance (*9) | | A | A | A | A | A |
| | Acid resistance (*10) | | A | A | A | C | A |
| | Low temperature flexibility (*11) | | B | B | B | A | B |
| | Gloss (*12) | | 99 | 100 | 98 | 96 | 82 | parative Examples to a thickness of 40 μm (when cured), and the coating was cured by heating at 120° C. for 30 minutes. The obtained coating film was tested at 20° C. for TUKON hardness using a TUKON microhardness tester manufactured by American Chain & Cable Company. The harder the coating film, the higher the TUKON hardness value.

(*6) Glass transition temperature: The separated film was tested for dynamic glass transition temperature (°C.) using a Vibron dynamic viscoelasticity measuring device (Dynamic Viscoelastometer Model Vibron DDV-IIEA, product of Toyo Baldwin Co. Ltd.) at a frequency of 110 Hz and a heating rate of 3° C./min. The film used for the measurement was obtained by applying the coating composition to a polypropylene panel and separating the coating.

(*7) Molecular weight between crosslinks: A theoretical value calculated by applying the glass transition temperature obtained above in (*6) to the following rubber viscoelasticy equation.

Molecular weight between crosslinks (Mc)=3ρRT/Emin wherein R is equal to $8.131 \times 10^7$ (erg/°Kmol), T is a temperature (K) at which the elastic modulus is minimum, ρ is the density of the sample film (g/cm) which is generally 0.5, and Emin is the minimum elastic modulus (dyne/cm) in the high temperature range.

(*8) Stain resistance: The above obtained test coated panel was horizontally placed with the coated surface upward at a spot abutting on a road with heavy traffic. After being allowed to stand for 6 months, the coated surface was visualy inspected and evaluated as follows. A: No abnormalities, B: Slightly stained, C: Markedly stained with black or yellow spots, and D: The whole surface seriously stained black or yellow.

Color difference between the test coated panel immediately after film formation and the same panel after exposure was measured using a S&M Color Computer Model 4 (product of Suga Shikenki Co.)

(*9) Weather resistance: The above obtained test coated panel was exposed to a sunshine weather-O-meter for 1600 hours. The resulting coating surface was observed and evaluated as follows. A: No abnormalities, B: fine crazings to a slight degree, C: noticeable crazings.

(*10) Acid resistance: 0.4 ml of artificial rain was dropped on the abcve obtained test coated panel. The panel was heated for 15 minutes on a hot plate heated to 85° C., and washed with water. The coated surface was observed and evaluated as follows. A: No change, B: no change on the coated surface, but a slight difference in thickness at the boundary of the portion to which the rain dropped, C: tarnishing on the coated surface.

The artificial rain used was a mixture of 19.6 g of a 1 mg/g solution of $NaNO_3$, 5.2 g of a 1 mg/g solution of $KNO_3$, 3.7 g of a 1 mg/g solution of $CaCl_2.2H_2O$, 8.2 g of a 1 mg/g solution of $MgSO_4.7H_2O$, 73.3 g of a 1 mg/g solution of $(NH_4)_2SO_4$, 30.0 g of a 0.1N solution of $H_2SO_4$, 20.0 g of a 0.1N solution of $HNO_3$, 10.0 g of a 0.05N solution of HCl and 4.7 g of a 1 mg/g solution of NaF, the mixture being adjusted to pH 1 with $H_2SO_4$.

(*11) Low-temperature flexibility: After allowing the test coated panel to stand in an atmosphere at −20° C. for 4 hours, an iron rod 20 mm in diameter was placed on the test coated panel, which was then bent at an angle of 180° C. around the iron rod. The resulting panel was observed and evaluated as follows. A: No defects such as crazings or crackings at the bent portion, B: crazings or crackings to a slight degree, C: crazings or crackings, D: noticeable crazings or crackings.

(*12) Gloss: The 60° specular reflectivity (%) was measured using the above obtained test coated panel.

Examples using a combination of a hydroxyl-containing vinyl resin (A) and a hydroxyl-containing polyester resin (B) as the hydroxyl-containing resin

EXAMPLES 4 TO 7 AND COMPARATIVE EXAMPLES 3 AND 4

The coating compositions of Examples 4 to 7 and Comparative Examples 3 and 4 were prepared using the components shown in Table 4, diluted in the same manner as in Example 1 and subjected to the above tests.

The results are shown in Table 4.

TABLE 4

|  |  |  | Example | | | | Comp | |
|---|---|---|---|---|---|---|---|---|
|  |  |  | 4 | 5 | 6 | 7 | 3 | 4 |
| Component | Component (A) | Kind | A-4 | A-1 | A-2 | A-2 | A-6 | A-4 |
|  |  | Amount | 50 | 50 | 50 | 50 | 50 | 50 |
|  | Component (B) | Kind | B-2 | B-1 | B-1 | B-2 | B-1 | B-2 |
|  |  | Amount | 20 | 20 | 20 | 20 | 20 | 20 |
|  | Component (C) (*1) |  | 25 | 25 | 25 | 25 | 25 | 25 |
|  | Component (D) (D-1) |  | 5 | 5 | 5 | 5 | 5 | 5 |
|  | Catalyst (*2) |  | 1 | 1 | 1 | 1 | 1 | 1 |
|  | Component (E) (*3) |  | 0.1 | 0.1 | 0.1 | 0.1 | 0.1 | — |
|  | UV absorber (*4) |  | 2 | 2 | 2 | 2 | 2 | 2 |
| Film property | TUKON hardness (*5) |  | 10 | 9 | 8 | 10 | 3 | 9 |
|  | Glass transition temperature (*6) |  | 81 | 79 | 73 | 80 | 56 | 81 |
|  | Molecular weight between crosslinks (*7) |  | 684 | 676 | 640 | 693 | 647 | 682 |
| Test result | Stain resistance (*8) | Visual inspection | A | A | B | A | D | A |
|  |  | Color difference ΔE | 0.4 | 0.5 | 0.7 | 0.4 | 4.8 | 0.4 |
|  | Weather resistance (*9) |  | A | A | A | A | A | A |
|  | Acid resistance (*10) |  | A | A | A | A | B | A |
|  | Low temperature flexibility (*11) |  | B | B | B | B | A | B |
|  | Gloss (*12) |  | 99 | 98 | 99 | 100 | 98 | 81 |

In Table 4, (*1) to (*12) are as described above for Table 3.

The coating composition of the present invention can form a coating film excellent in performance characteristics such as stain resistance, flexibility, weather resistance, scratch resistance, processability, acid resistance, gloss, etc., especially in stain resistance, acid resistance, flexibility and gloss.

We claim:
1. A top coating composition comprising:
(A) A hydroxyl-containing vinyl resin containing 40 to 90 wt. % of an aromatic hydrocarbon ring-containing vinyl monomer as a monomer component,
(C) hexamethoxymethylmelamine and/or an etherified melamine resin obtained by substituting a part or the whole of the methoxy groups in hexamethoxymethylmelamine by an alkoxy group having at least 4 carbon atoms, (D) a particulate polymer having an average particle diameter of 0.01 to 1 μm, and (E) a polysiloxane compound represented by the formula

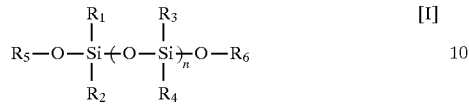

wherein $R_1$, R2, $R_3$ and $R_4$ are the same or different and each represent a $C_{1-10}$ alkyl group, a $C_{1-10}$ alkoxy group or a hydroxyl group, $R_5$ and $R_6$ are the same or different and each represent $C_{1-10}$ alkyl group or a hydrogen atom, and n is an integer of 10 to 1,000, wherein the proportion of the component (E) is 0.05 to 0.5 wt. part based on 100 wt. parts of the total amount of the components (A), (C) and (D).

2. A coating composition according to claim 1 wherein the aromatic hydrocarbon ring-containing vinyl monomer in the hydroxyl-containing vinyl resin (A) is styrene or a combination of styrene and other aromatic hydrocarbon ring-containing vinyl monomer.

3. A coating composition according to claim 1 wherein the weight average molecular weight of the hydroxyl-containing vinyl resin (A) is 3,000 to 30,000.

4. A coating composition according to claim 1 wherein the particulate polymer (D) is a nonaqueous dispersion vinyl resin.

5. A coating composition according to claim 1 wherein the proportions of the components (A), (C) and (D) are 30 to 80 wt. %, of the component (A), 5 to 40 wt. % of the component (C) and 3 to 30 wt. % of the component (D) based on 100 wt. % of the total amount of said components, and the proportion of the component (E) is 0.05 to 0.5 wt. part based on 100 wt. parts of the total amount of the components (A), (C) and (D).

6. A top coating composition comprising:

(A) A hydroxyl-containing vinyl resin containing 40 to 90 wt. % of an aromatic hydrocarbon ring-containing vinyl monomer as a monomer component, (B) a hydroxyl-containing polyester resin, (C) hexamethoxymethylmelamine and/or an etherified melamine resin obtained by substituting a part or the whole of the methoxy groups in hexamethoxymethylmelamine by an alkoxy group having at least 4 carbon atoms, (D) a particulate polymer having an average particle diameter of 0.01 to 1 μm, and (E) a polysiloxane compound represented by the formula

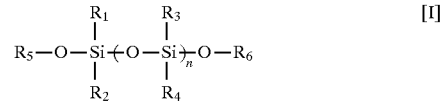

wherein $R_1$, $R_2$ $R_3$ and $R_4$ are the same or different and each represent a $C_{1-10}$ alkyl group, a $C_{1-10}$ alkoxy group or a hydroxyl group, $R_5$ and $R_6$ are the same or different and each represent $C_{1-10}$ alkyl group or a hydrogen atom, and n is an integer of 10 to 1,000, wherein the proportion of the component (E) is 0.05 to 0.5 wt. part based on 100 wt. parts of the total amount of the components (A), (B), (C) and (D).

7. A coating composition according to claim 6 wherein the proportions of the components (A), (B), (C) and (D) are 20 to 70 wt. % of the component (A), 5 to 40 wt. % of the component (B), 5 to 40 wt. % of the component (C) and 3 to 30 wt. % of the component (D) based on 100 wt. % of the total amount of said components, and the proportion of the component (E) is 0.05 to 0.5 wt. part based on 100 wt. parts of the total amount of the components (A), (B), (C) and (D).

* * * * *

UNITED STATES PATENT AND TRADEMARK OFFICE
CERTIFICATE OF CORRECTION

PATENT NO. : 5,880,187
DATED : March 9, 1999
INVENTOR(S) : Kawazu et al

It is certified that error appears in the above-indentified patent and that said Letters Patent is hereby corrected as shown below:

Title Page: Item [73] the assignee, "Toyota Jidosha Kabushiki Kaisha, Aichi-ken, Japan" is in error. The assignee should be --Toyota Jidosha Kabushiki Kaisha, Aichi-ken, Japan; Kansai Paint Company, Limited. Hyogoi-ken, Japan--.

Signed and Sealed this

Twelfth Day of October, 1999

Attest:

Q. TODD DICKINSON

*Attesting Officer*   *Acting Commissioner of Patents and Trademarks*